US010749667B2

(12) United States Patent
Durvasula et al.

(10) Patent No.: US 10,749,667 B2
(45) Date of Patent: Aug. 18, 2020

(54) SYSTEM AND METHOD FOR PROVIDING SATELLITE GTP ACCELERATION FOR SECURE CELLULAR BACKHAUL OVER SATELLITE

(71) Applicant: HUGHES NETWORK SYSTEMS, LLC, Germantown, MD (US)

(72) Inventors: Bhanu Durvasula, Germantown, MD (US); Gaguk Zakaria, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 174 days.

(21) Appl. No.: 15/858,659

(22) Filed: Dec. 29, 2017

(65) Prior Publication Data
US 2019/0207747 A1    Jul. 4, 2019

(51) Int. Cl.
| | |
|---|---|
| H04L 9/06 | (2006.01) |
| H04L 9/30 | (2006.01) |
| H04L 9/08 | (2006.01) |
| H04L 9/32 | (2006.01) |
| H04L 29/12 | (2006.01) |
| H04W 76/15 | (2018.01) |
| H04B 7/185 | (2006.01) |
| H04W 12/04 | (2009.01) |
| H04L 29/06 | (2006.01) |

(Continued)

(52) U.S. Cl.
CPC ....... *H04L 9/0631* (2013.01); *H04B 7/18578* (2013.01); *H04L 9/088* (2013.01); *H04L 9/0844* (2013.01); *H04L 9/30* (2013.01); *H04L 9/3263* (2013.01); *H04L 61/2592* (2013.01); *H04L 63/0823* (2013.01); *H04L 63/164* (2013.01); *H04W 12/04* (2013.01); *H04W 12/06* (2013.01); *H04W 76/15* (2018.02); *H04W 88/16* (2013.01)

(58) Field of Classification Search
CPC ... H04L 63/0428; H04L 9/0844; H04L 69/22; H04L 47/803; H04W 28/0215
USPC ........................................................ 713/156
See application file for complete search history.

(56) References Cited

U.S. PATENT DOCUMENTS

| | | | |
|---|---|---|---|
| 2003/0112772 A1* | 6/2003 | Chatterjee ............ | H04B 7/1858 370/316 |
| 2003/0147403 A1 | 8/2003 | Border et al. | |

(Continued)

FOREIGN PATENT DOCUMENTS

WO    2003/107604 A1    12/2003

OTHER PUBLICATIONS

International Search Report & Written Opinion in PCT/US2018/068072, dated Mar. 22, 2019.

*Primary Examiner* — Bryan F Wright
(74) *Attorney, Agent, or Firm* — Jones Robb, PLLC

(57) ABSTRACT

A method and system for providing GTP acceleration for secure cellular backhaul over satellite (CBoS). A satellite terminal receives request from a first entity to establish a security association with a second entity, and establishes a first secure tunnel to a gateway. A second secure tunnel is then established between the gateway and the second entity based on a certificate belonging to the first entity. A third secure tunnel is established between the satellite terminal and the first entity based on a certificate belonging to the second entity. The contents of encrypted traffic between the first entity and the second entity are examined so that GTP acceleration may be applied to eligible traffic transmitted over the first secure tunnel.

20 Claims, 9 Drawing Sheets

(51) Int. Cl.
*H04W 12/06* (2009.01)
*H04W 88/16* (2009.01)

(56) References Cited

U.S. PATENT DOCUMENTS

| | | | |
|---|---|---|---|
| 2006/0262783 A1* | 11/2006 | Nedeltchev | H04L 63/0428 |
| | | | 370/389 |
| 2011/0016180 A1 | 1/2011 | Bharadhwaj et al. | |
| 2011/0289311 A1* | 11/2011 | Roy-Chowdhury | ........................ |
| | | | H04L 9/0844 |
| | | | 713/151 |
| 2013/0191257 A1 | 7/2013 | Koodli et al. | |
| 2015/0124616 A1 | 5/2015 | Lohman et al. | |
| 2015/0140983 A1* | 5/2015 | Cosimini | H04W 28/0215 |
| | | | 455/418 |
| 2015/0382240 A1* | 12/2015 | Hecht | H04L 69/22 |
| | | | 370/316 |
| 2016/0048397 A1* | 2/2016 | Morales | G06F 9/441 |
| | | | 713/2 |
| 2016/0192235 A1* | 6/2016 | Ahluwalia | H04L 69/22 |
| | | | 370/329 |
| 2017/0279803 A1 | 9/2017 | Desai et al. | |
| 2018/0183855 A1* | 6/2018 | Sabella | H04L 47/803 |

* cited by examiner

SYSTEM AND METHOD FOR PROVIDING SATELLITE GTP ACCELERATION FOR SECURE CELLULAR BACKHAUL OVER SATELLITE

BACKGROUND INFORMATION

Cellular networks are increasingly using satellite communication systems to carry cellular backhaul traffic between an Evolved Node B (eNodeB, or eNB) and Evolved Packet Core (EPC) in LTE networks. Such satellite backhaul networks carry traffic from various applications such as Web Browsing, VoIP (voice over IP), audio and video streaming, etc. The satellite backhaul network also carries signaling packets between eNodeB and EPC. For over the air security between the eNodeB and mobile devices, user data and control signal messages are encrypted. On the internet protocol (IP) network, IP security (IPsec) is usually employed between the eNodeB and the EPC.

In order to optimize the use of available bandwidth, satellite networks typically provide quality of service (QoS) based prioritization, transmission control protocol (TCP) acceleration, etc. Satellite networks can also implement efficient ways of carrying traffic over satellite link, such as header compression and data compression. Such techniques and services, however, require that the very small aperture terminal (VSAT, or simply terminal) and the gateway are capable of identifying the traffic type of traffic being exchanged. Thus, it would be possible for the terminal and gateway to treat the traffic in accordance with their characteristics. For example, the satellite system could provide high priority treatment for real-time traffic such as voice communication that is very sensitive to latency. Conversely, traffic such as web browsing can be treated as low priority.

General Packet Radio Service (GPRS) tunneling protocol (GTP) acceleration has been developed to improve cellular traffic being carried over the satellite network. GTP acceleration is applied to cellular traffic between eNodeB and EPC that is flowing in the GTP tunnel of the satellite network. The GTP Acceleration can provide, for example, GTP tunnel header reduction, TCP acceleration, data compression, and QoS-based traffic prioritization, etc. Secure cellular traffic, however, utilizes IPsec to protect the traffic between eNodeB and EPC. Consequently, the terminal and gateway will not be able to determine the type of traffic being transmitted for cellular backhaul over satellite (CBoS). The terminal and gateway are, therefore, unable to provide the satellite GTP acceleration to the secure cellular traffic. Based on the foregoing, there is a need for an approach for applying satellite GTP acceleration to CBoS traffic while maintaining end to end IPsec encryption between the eNodeB and EPC.

BRIEF SUMMARY

A method and system are disclosed for providing GTP acceleration for secure cellular backhaul over satellite (CBoS). According to an embodiment, the system includes a gateway including one or more processors, one or more transceivers, and one or more communication interfaces; a satellite terminal including at least one processor, at least one transceiver, and at least one communication interface; and a satellite for facilitating communication between the gateway and the satellite terminal. The satellite terminal is configured to: receive a request from a first entity to establish a security association with a second entity, establish a first secure tunnel with the gateway, establish a third secure tunnel with the first entity based, at least in part, on a certificate belonging to the second entity, a first entity public key, and a satellite terminal public key, examine contents of encrypted traffic from the first entity, and apply GTP acceleration to eligible traffic transmitted over the first secure tunnel. The gateway is configured to: establish a second secure tunnel with the second entity based, at least in part, on a certificate belonging to the first entity, examine contents of encrypted traffic from the second entity, and apply GTP acceleration to eligible traffic transmitted over the first secure tunnel. The first entity and the second entity are part of a different communication syste, and an end to end IPsec tunnel is established between the first entity and the second entity.

According to another embodiment, the method includes receiving a request from a first entity to establish a security association with a second entity, the request being received by a satellite terminal of a satellite communication system, the first entity and the second entity being part of a different communication system; establishing a first secure tunnel between the satellite terminal and a gateway of the satellite communication system; establishing a second secure tunnel between the gateway and the second entity based, at least in part, on a certificate belonging to the first entity; establishing a third secure tunnel between the satellite terminal and the first entity based, at least in part, on a certificate belonging to the second entity, a first entity public key, and a satellite terminal publx key; examining contents of encrypted traffic between the first entity and the second entity; and applying GTP acceleration to eligible traffic transmitted over the first secure tunnel, wherein an end to end IPsec tunnel is established between the first entity and the second entity.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for providing GTP acceleration for (CBoS), are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
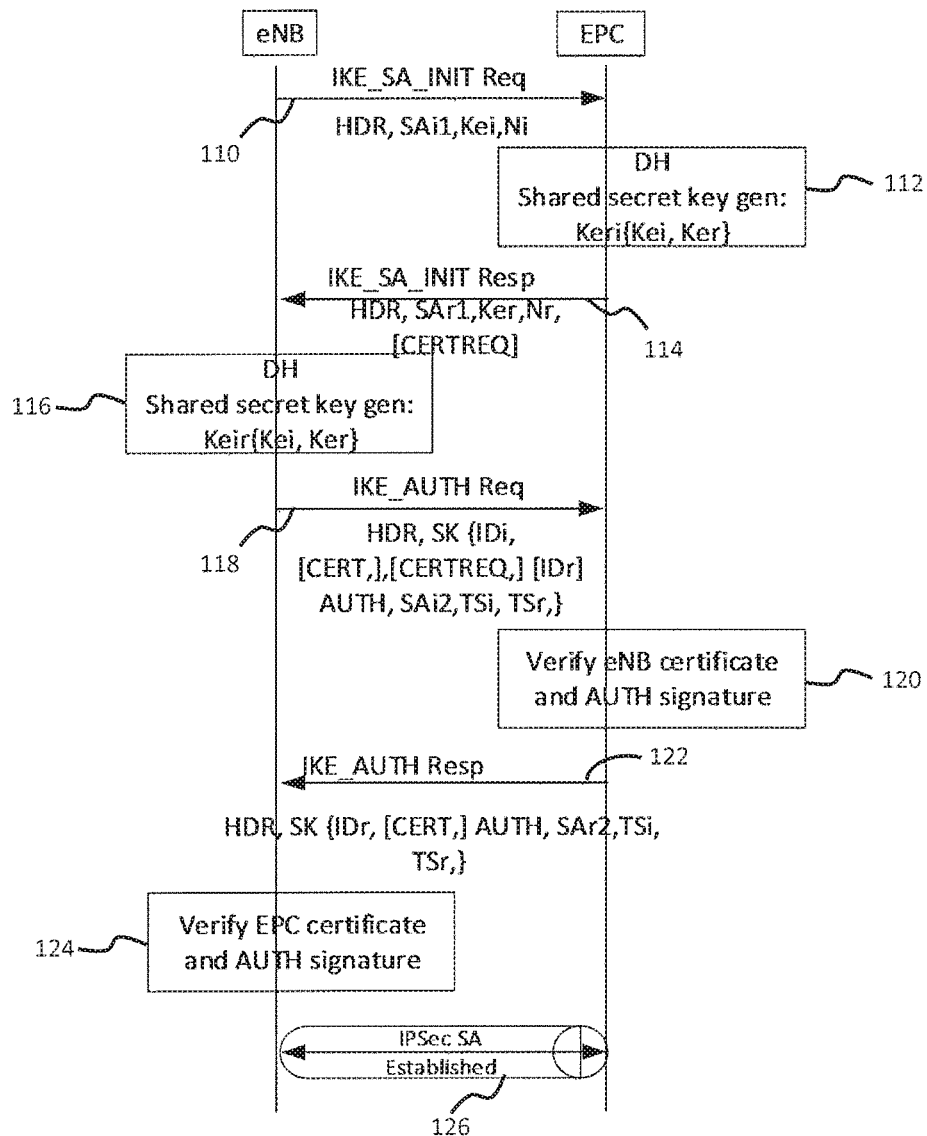
FIG. 1 is a diagram illustrating a conventional process for establishing an IPsec security association between components of a cellular network.

FIG. 1 is a diagram illustrating a conventional process for establishing an IPsec security association (or IPsec tunnel) between components of a cellular network, such as eNodeB and EPC. At 110, the eNB sends a request to initiate a security association (IKE_SA_INIT Req) to the EPC. The eNB includes various information within the request, such as its public key Kei, the supported encryption algorithms SAil, and Ni (which is random number). At 112, the EPC applies a Diffie-Hellman key exchange algorithm based on Kei and its public key (Ker) in order to generate a shared secret key that can be used to encrypt traffic between itself and the eNB. At 114, the EPC sends a response (IKE_SA_INIT Resp) to the eNB. The response includes the EPC public key Ker, the supported encryption algorithms SAr1, and Nr. The EPC response also includes a CERTREQ parameter requesting the eNB to send its certificate. At 116, the eNB applies a Diffie-Hellman key exchange algorithm based on its public key (Kei) and the EPC public key (Ker) in order to generate a shared secret key that can be used to encrypt traffic with the EPC. At 118, the eNB sends a request to initiate authorization (IKE_AUTH_INIT) to the EPC containing its certificate, identity (IDi), and CERTREQ parameter requesting the EPC to send its certificate. The eNB can also include an IDr parameter to indicate the identity of the EPC with which it would like to setup the IPsec connection. This authorization request (IKE_AUTH_INIT Req) is encrypted and integrity protected. When the EPC receives IKE_AUTH_INIT Req, it contacts the certificate authority (CA) to validate the eNB certificate. This is indicated a 120. Once the eNB is certified, the EPC sends a response (IKE_AUTH_INIT Resp), at 122, including its certificate (CERT). This response message is also encrypted and integrity protected. At 124, the eNB receives the response (IKE_AUTH_INIT Resp) from the EPC, and validates the EPC certificate. Upon validating the EPC certificate, the IPsec Security Association (SA) tunnel between EPC and eNB is established at 126.

Figure 2:
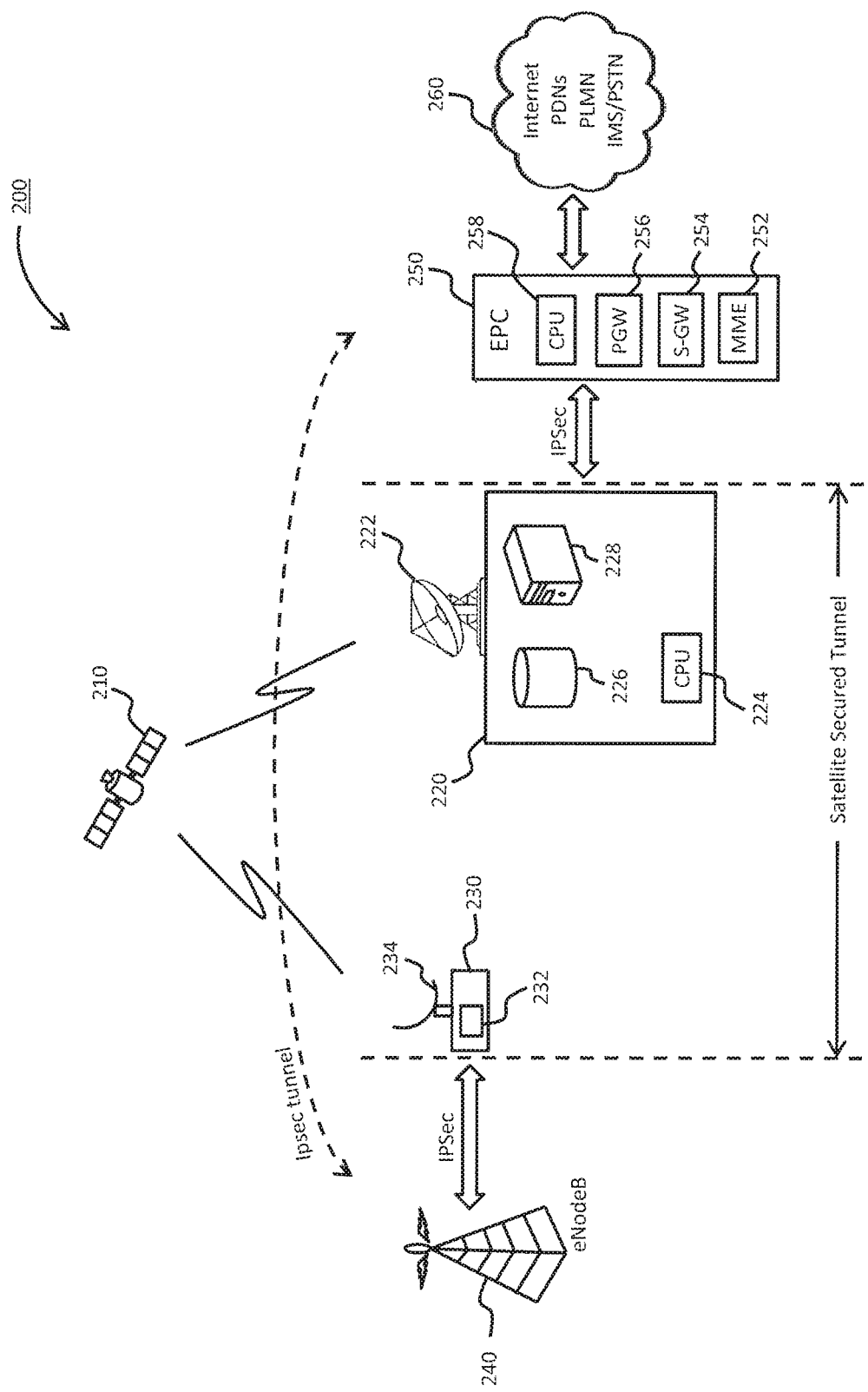
FIG. 2 is a diagram of a system capable of providing GTP acceleration for secure cellular backhaul over satellite (CBoS), according to one embodiment.

FIG. 2 is a diagram of a system capable of providing GTP acceleration for secure cellular backhaul over satellite (CBoS), according to at least one embodiment. The system 200 includes a satellite 210 capable of transmitting and receiving signals from various terrestrial-based communications systems. The system 200 also includes a gateway 220 and a remote terminal 230. While a single gateway and terminal are illustrated in FIG. 2, it should be noted that other embodiments can incorporate multiple gateways 220 and terminals 230. The system 200 provides GTP acceleration for secure cellular backhaul over satellite (CBoS) for sessions from external networks. The external networks that can include one or more Evolved Node B (eNodeB) stations 240 (only one shown) and one or more evolved packet cores (EPC) 250 (only one shown). According to at least one embodiment, the external network can be a mobile 4G/LTE network. According to further embodiments, the external network can be other types of mobile networks utilizing data packets for transmission of voice and/or data. As further illustrated in FIG. 2, the EPC 250 can communicate with various public/private networks 260 such as the internet, public data networks (PDN), public land mobile networks (PLMN), IP media subsystems (IMS), public switched telephone networks (PSTN), etc. Additionally, the eNodeB is capable of communicating directly with user equipment such as mobile handsets (not shown).

The gateway 220 can include various components to facilitate communication with the satellite 210 and EPC 250. According to at least one embodiment, the gateway 220 can include a radio frequency (RF) transceiver 222, a processing unit 224 (or computer, CPU, etc.), and a data storage unit 226. The data storage unit 226 can be used to store and provide various access to information pertaining, in part, to operations in the satellite network. According to other embodiments, the gateway 220 can include multiple processing units 224 and multiple data storage units 226 in order to accommodate the needs of a particular system implementation. The gateway 220 can also include one or more workstations 228 (e.g., computers, laptops, etc.) in place of, or in addition to, the one or more processing units 224. According to various implementations, the processing unit 224 and/or workstation 228 are capable of executing program instructions such that they become configured to perform various functions associated with operation of the gateway 220.

The system 200 also includes multiple terminals 230 (only one shown) that are part of the satellite network. Such terminals 230 can be configured, for example, as very small aperture terminals (VSAT) that are capable of transmitting/receiving information to/from the satellite 210. As such, the terminal 230 includes hardware such as computing units 232 (e.g., CPU, PC, laptop, server, etc.), RF transceiver 234, etc. The terminal 230 can also include additional hardware such as modulator/demodulator, physical interfaces (e.g., network interface controller), etc. that facilitate connection to the eNodeB 240. As previously discussed, the eNodeB 240 is an entity/hardware component of a mobile network and provides direct communication with mobile user equipment (e.g., handsets, tablets, modems, etc.). According to one or more embodiments, the eNodeB 240 can also include one or more computing units 242 capable of executing program instructions such that they become configured to manage various operations such as, for example, providing security to traffic being exchanged with the terminal 234.

As illustrated in FIG. 2, the evolved packet core (EPC) 250 can include a mobility management entity (MME) 252, a serving gateway (S-GW) 254, a packet data gateway (PGW) 256, and one or more computing units 258. According to at least one embodiment, the mobility management entity (MME) 252 can be configured to perform various paging and tagging activities for user equipment capable of accessing the system 200, as well as managing security keys. The S-GW 254 and PGW 256 can be configured to route data packets received from public/private networks 260 to the eNodeB 240 and vice versa. The gateway 220 can be configured to provide connectivity to data packets being transmitted over the satellite network to/from the S-GW 254 and PGW 256. For example, the gateway 220 can provide policy enforcement, filter and/or screen packets transmitted over the satellite network, etc. According to at least one embodiment, the computing unit 258 can execute program instructions so that it becomes configured to perform various functions such as providing security for traffic transmitted to or received from the gateway 220. According to other embodiments, the computing unit 258 can be configured to perform some or all of the functions associated with the MME 252, S-GW 254, and PGW 256.

According to at least one embodiment, the eNodeB 240 exchanges traffic with the terminal 230 via an encrypted IPsec tunnel. Traffic between the terminal 230 and gateway 220 is exchanged using a satellite secured tunnel. According to one specific implementation, the satellite secured tunnel can implement AES-256 security encryption. According to other implementations, the satellite secured tunnel can also implement IPsec encryption. As further illustrated in FIG. 2, traffic between the gateway 220 and the EPC 250 is also exchanged via an encrypted IPsec tunnel. As will be discussed in greater detail below, an end to end IPsec is established between the eNodeB 240 and the EPC 250.

When traffic must be exchanged between the eNodeB 240 and the EPC 250, an IPsec tunnel is established in order to provide security to the contents of the traffic. The request to establish the IPsec tunnel can be initiated, for example, via a request from the eNodeB 240. This request is transmitted to the terminal 230 so that the CBoS link can be utilized to deliver the request to the EPC 250. Various information is exchanged between the eNodeB 240 and EPC 250 over the satellite link in order to establish the IPsec tunnel. Conventional CBoS traffic would not benefit from satellite GTP acceleration techniques, because the encryption prevents the gateway 220 or the terminal 230 from detecting the contents of the traffic. According to various embodiments, however, the gateway 220 and terminal 230 are capable of accessing the contents of traffic from the EPC 250 and eNodeB 240, respectively. Thus, GTP acceleration techniques can be applied to CBoS traffic without compromising security. Without such GTP acceleration techniques, all traffic will be treated with the same priority level, e.g. a voice communication could potentially be subject to the same QoS as a background file transfer, download or upload.

Figure 3:
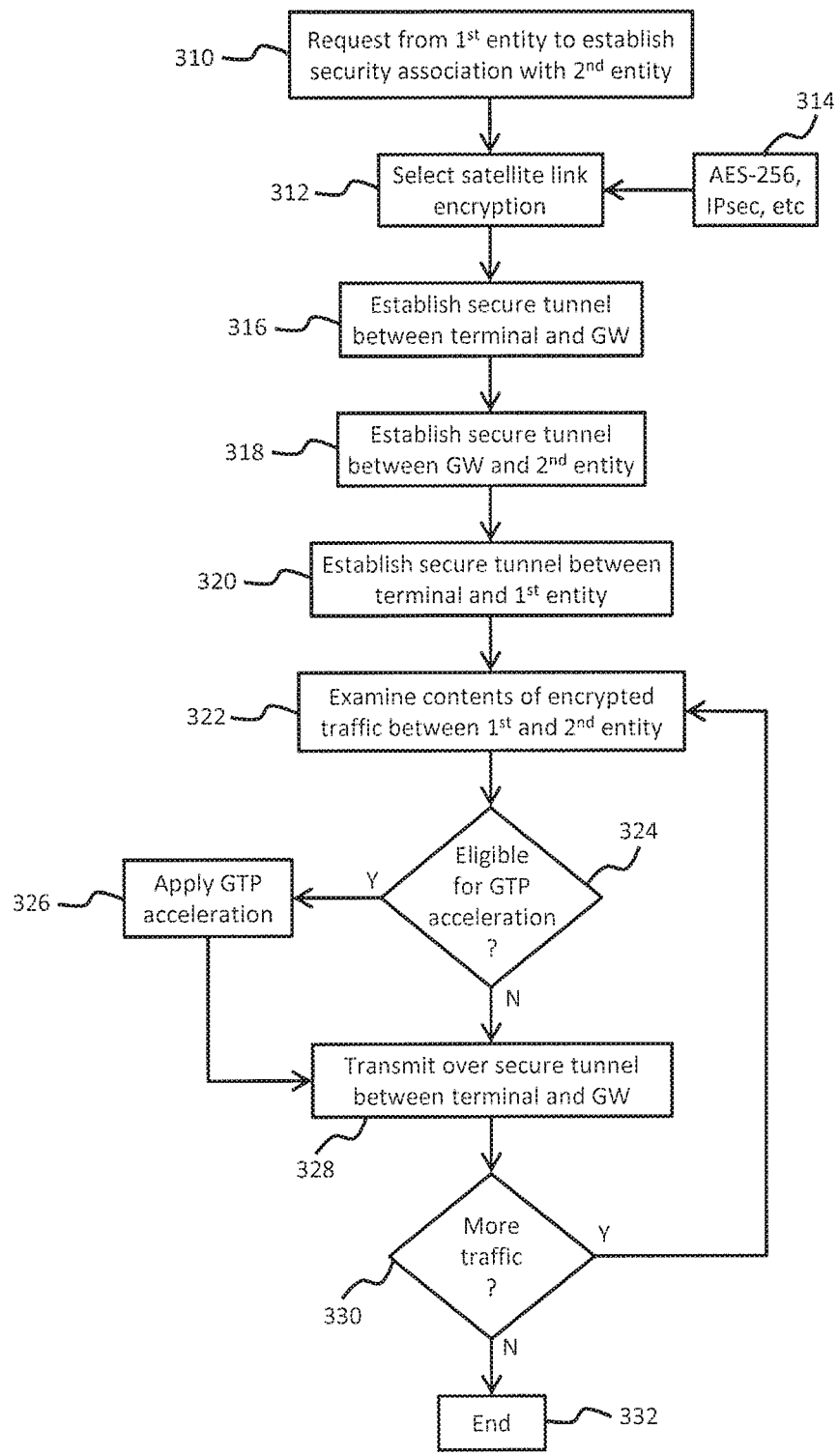
FIG. 3 is a flowchart of a process for providing GTP acceleration for secure CBoS, according to at least one embodiment.

FIG. 3 is a flowchart of a process for providing GTP acceleration for secure CBoS, according to at least one embodiment. At 310, a request is received from a first entity to establish a security association with a second entity. This can correspond, for example, to the eNodeB attempting to establish a security association with the EPC. As previously discussed, the request can be received by a terminal that is configured to provide CBoS service to the eNodeB. The request is unencrypted and its contents are, therefore, accessible to the terminal. At 312, the terminal selects an appropriate encryption technique to apply while communicating with its corresponding gateway. Depending on the specific implementation, various security protocols may be available to the terminal. For example, the satellite communication system may implement an AES-256 encryption scheme for all traffic being channeled through the satellite. According to other implementations, IPsec security encryption may be applied to traffic being channeled through the satellite. This is illustrated at 314, where various types of security protocols are supplied so that a selection may be made.

At 316, a first secure tunnel is established between the terminal and the gateway using the security protocol that has been selected. It should be noted, however, that selection of the security protocol can be dictated by agreement with the owner of the eNodeB and EPC. For example, an agreement may be established to ensure the use of IPsec encryption or AES-256 encryption. The satellite communication system may inherently implement AES-256 encryption, and such encryption would be applied in situations where an agreement does not exist. At 318, a second secure tunnel is established between the gateway and the second entity (e.g., the EPC). According to at least one embodiment, the second secure tunnel established between the gateway and the second entity can be based, in part, on a certificate which belongs to the first entity (e.g., eNodeB).

At 320, a third secure tunnel is established between the terminal and the first entity. The third secure tunnel can be based, in part, on a certificate which belongs to the second entity (e.g., EPC). According to various embodiments, the second secure tunnel between the gateway and the second entity, and the third secure tunnel between the terminal and the first entity can both implement IPsec protocols. Upon establishing the three secure tunnels, an end to end IPsec tunnel is created between the first entity and the second entity. Thus, all traffic between the first entity and the second entity is encrypted and cannot be accessed by any unauthorized parties. The eNodeB can now send encrypted traffic to the EPC.

At 322, the contents of encrypted traffic between the first entity and the second entity are examined. According to various embodiments, the terminal and the gateway can be configured to decrypt traffic originating from the first entity and the second entity in order to determine the payload (or message) contents. At 324, it is determined whether the encrypted traffic is eligible for satellite acceleration, namely GTP acceleration over the satellite link. As previously discussed, depending on the particular type of traffic, it is possible to provide various acceleration techniques in order to increase speed, reduce latency, increase throughput, and/or improve overall user experience. For example, header reduction can be applied to the traffic, as well as data compression. Furthermore, traffic between the first entity and the second entity can be prioritized based on QoS requirements. For example, voice communication may be prioritized over transmission of large data files.

If it is determined that the traffic between the first entity and the second entity is eligible for GTP acceleration over the satellite link, control passes to 326. Various techniques are applied, as previously discussed, to improve the traffic flow between the first entity and the second entity. Control then passes to 328. Similarly, if it is determined that the traffic is not eligible for GTP acceleration over the satellite link, control passes to 328. The traffic is then transmitted over the first secure tunnel established between the terminal and the gateway. At 330, it is determined whether additional traffic continues to flow between the first entity and the second entity. If traffic continues to flow, then control returns to 322. Otherwise, if there is no additional traffic being transmitted between the first entity and the second entity, the process and at 332.

Figure 4:
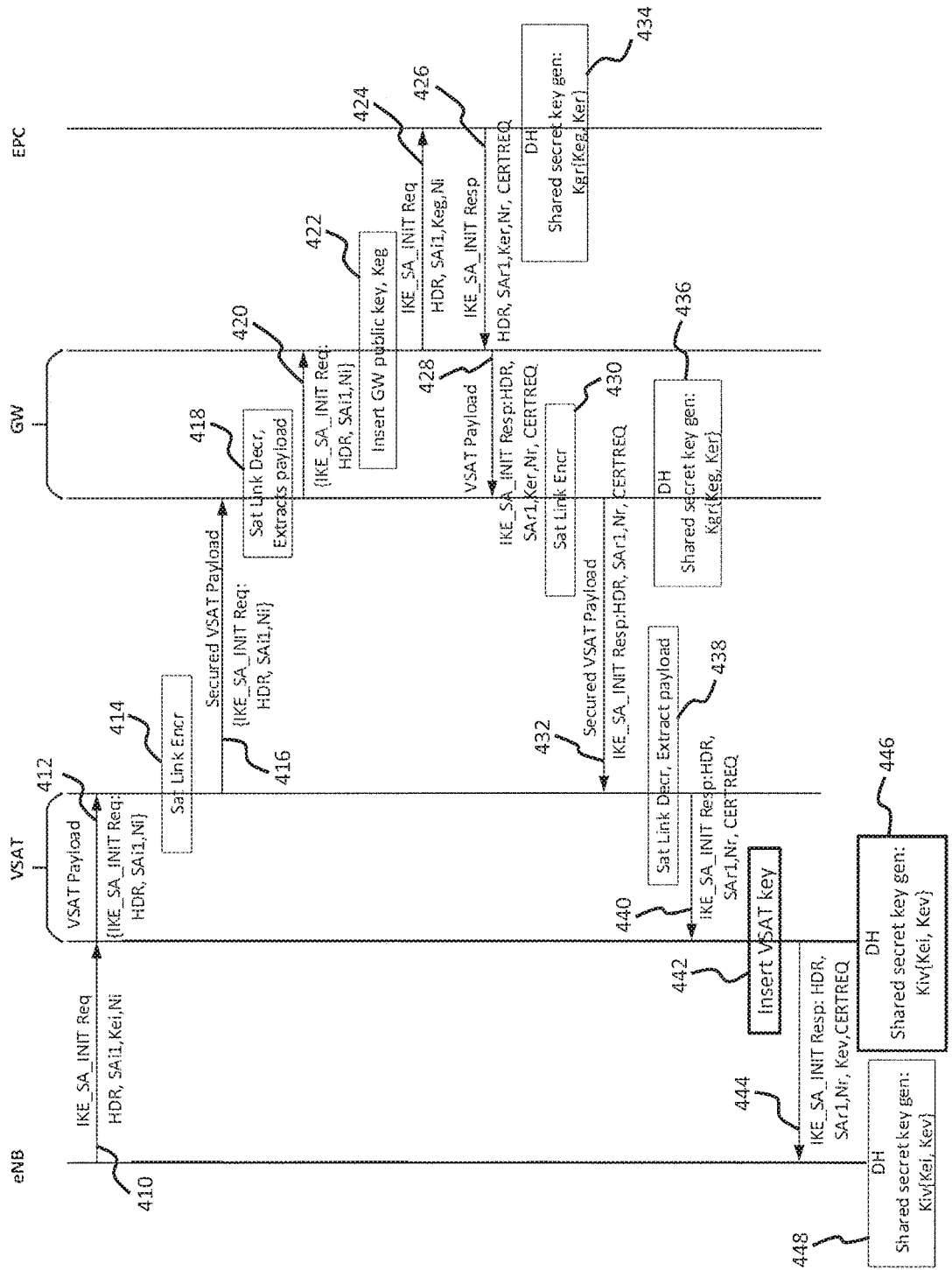
FIG. 4 is a diagram illustrating a process for initiating a security association between eNB and EPC over a satellite network, according to one or more embodiments.

FIG. 4 is a diagram illustrating a process for initiating a security association between eNodeB and EPC using CBoS, according to one or more embodiments. At 410, the eNodeB transmits a request (IKE_SA_INIT Req) to initiate a security association. The request can include various standard parameters such as, for example, a header (HDR), supported encryption algorithms (SAi1), etc. The request further includes a public key (Kei) belonging to the eNodeB. At 412, the terminal examines the request, and removes the public key belonging to the eNodeB. At 414, the terminal applies the appropriate encryption that has been selected for use between the terminal and the gateway (i.e., over the satellite link). As previously discussed, various security protocols can be implemented, including AES-256, IPsec, etc. A first secure link (or segment) is therefore established between the terminal and gateway. Thus, all traffic exchanged between the terminal and gateway is encrypted.

At 416, the terminal transmits the request to the gateway via the satellite. At 418, the gateway decrypts the transmission from the terminal in order to extract its payload. At 420, the gateway examines the request contained in the payload received from the terminal. At 422, the gateway inserts its public key (Keg) into the request as a replacement for the eNodeB public key (Kei). At 424, the gateway transmits the request to the EPC. Upon receiving the request, the EPC prepares a response (IKE_SA_INIT Resp) intended for the eNodeB. The response is transmitted to the gateway at 426. As illustrated in FIG. 4, the response includes various parameters including at least, a header (HDR), supported encryption algorithms (SAi1), a public key belonging to the EPC (Ker). The response further includes a request for the eNodeB to provide its unique certificate to the EPC.

At 428, the gateway receives the response (IKE_SA_INIT Resp) from the EPC and examines the contents. At 430, the gateway utilizes the appropriate encryption algorithm to encrypt the response received from the EPC for transmission over the satellite link. At 432, the gateway transmits the response to the terminal. At this point, the gateway and the EPC have exchanged public keys, and may each apply Diffie-Hellman key exchange algorithm in order to generate a shared secret key that can be used to encrypt subsequent traffic with the EPC. This is illustrated at 434 where the EPC generates the shared secret key. Similarly, the gateway generates the shared secret key at 436.

At 438, the terminal decrypts the transmission from the gateway in order to extract its payload. At 440, the terminal examines the contents of the response (IKE_SA_INIT Resp) originating from the EPC. At 442, the terminal inserts its public key (Key) into the response as a replacement for the EPC public key (Ker). At 444, the terminal transmits the response to the eNodeB. The response now contains all of the information originally provided by the EPC, except for the EPC public key (Ker). Instead, the public key from the terminal (Key) is utilized in place of the EPC public key. The terminal and eNodeB are now in possession of each other's public key. The terminal and the eNodeB now apply Diffie-Hellman key exchange algorithm in order to generate a shared secret key. This is illustrated at 446 for the terminal, and at 448 for the eNodeB. At this point, security associations exist between the eNodeB and the terminal, the terminal and gateway, and the gateway and EPC. Any subsequent communication can be encrypted to prevent unauthorized access.

Figure 5A:
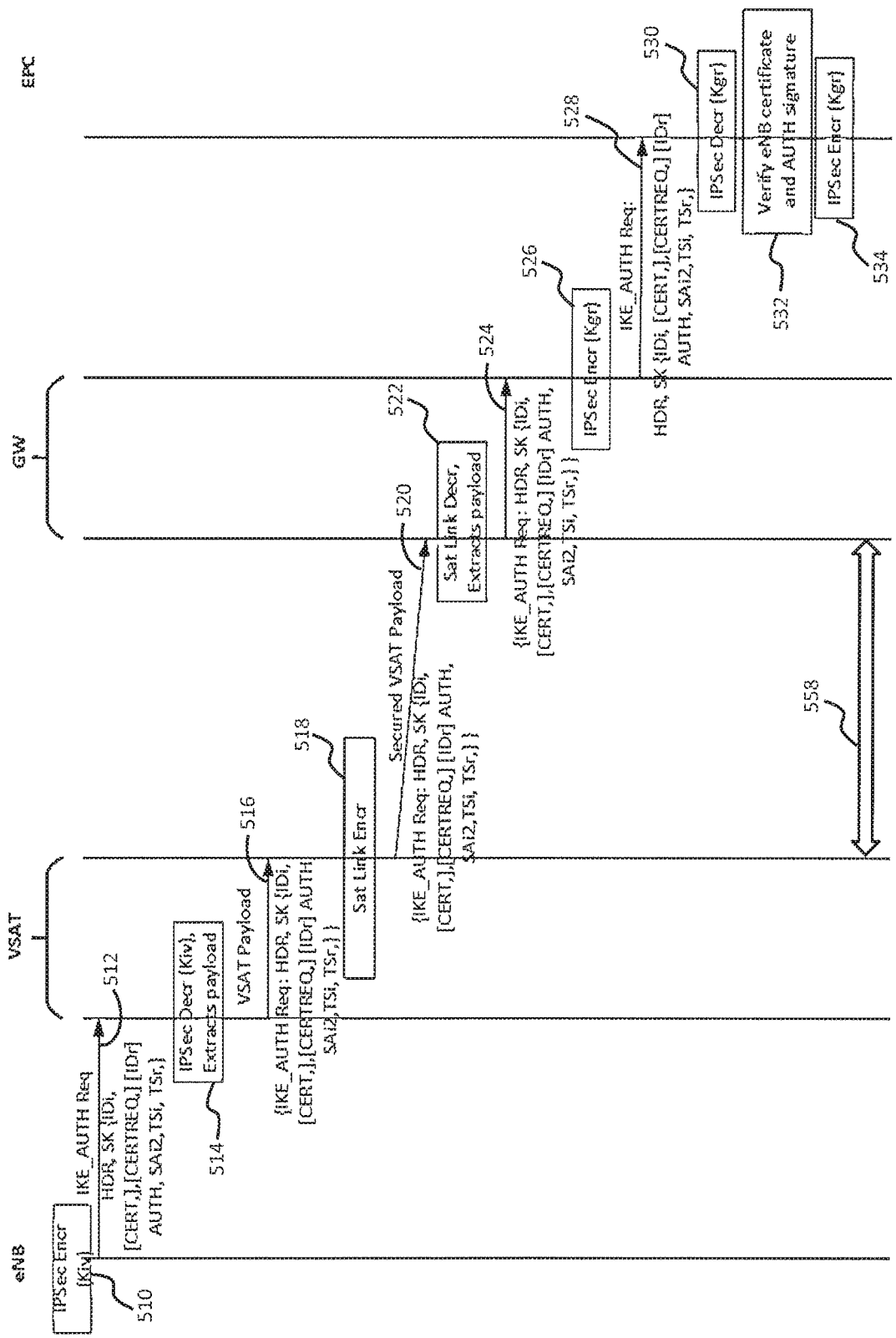
FIGS. 5A and 5B are a diagram illustrating a process for authenticating a security association between eNB and EPC over a satellite network, according to various embodiments.
Figure 5B:
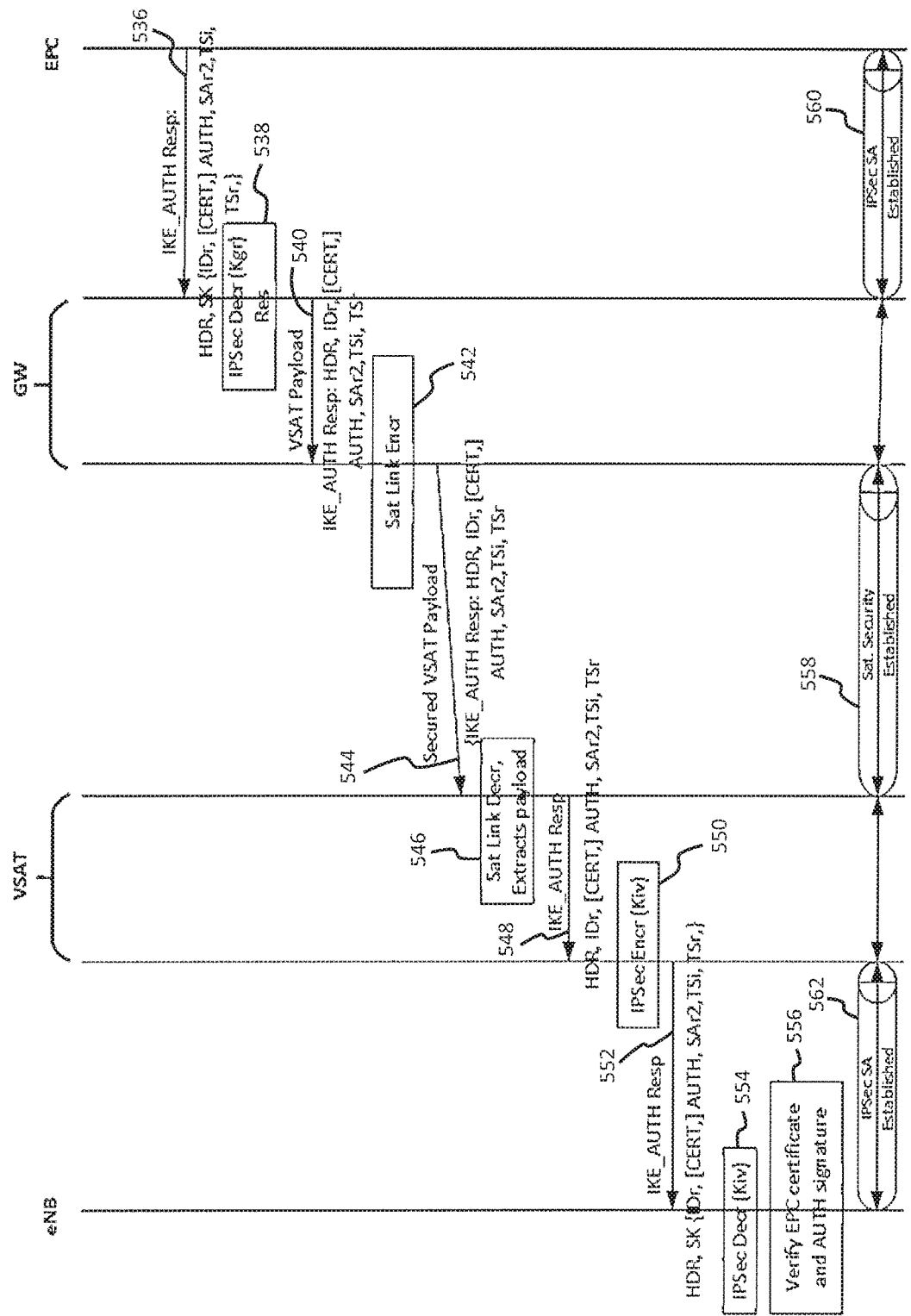

FIG. 5A and FIG. 5B are a diagram illustrating a process for authenticating the a security association between eNodeB and EPC using CBoS, according to various embodiments. At 510, the eNodeB applies the shared encryption key (Kiv{Kei, Kev} or simply Kiv) to an authorization request (IKE_AUTH_INIT Req) destined for the EPC. At 512, the authorization request is transmitted to the terminal. The authorization request can include an unencrypted header (HDR) and an encrypted payload. According to the illustrated embodiment, the encrypted payload includes at least an identification of the eNodeB (IDr), a certificate (CERT), certificate request (CERTREQ), and authorization (AUTH). At 514, the terminal utilizes its shared encryption key (Kiv) in order to decrypt the message received from the eNodeB. At 516, the terminal examines the contents of the message received from the eNodeB, and prepares a payload to be transmitted to the gateway. At 518, the terminal encrypts the message using the current encryption protocol between itself and the gateway (i.e., Sat Link Encr).

At 520, the message is transmitted to the gateway. At 522, the gateway decrypts the message received from the terminal and extracts the payload. At 524, the gateway examines the payload and prepares it for transmission to the EPC. At 526, the gateway utilizes the shared encryption key between itself and the EPC (Kgr{Keg, Ker} or simply Kgr) in order to encrypt the contents of the message. At 528, the gateway transmits the encrypted authorization request to the EPC. At 530, the EPC utilizes the shared secret key (Kgr) to decrypt the message received from the gateway. At 532, the EPC verifies the eNodeB certificate and authorization signature (AUTH) contained in the authorization request. According to at least one embodiment, the verification can be performed using various established entities that exist to provide such verification services. Alternatively, a security association database containing encryption and decryption keys can be queried in order to verify the certificate and digital signature.

At 534, the EPC prepares an authorization response and applies its shared secret key (Kgr) to encrypt the message. At 536, the EPC transmits the response (IKE_AUTH Resp) to the gateway. As illustrated and FIG. 5B, the authorization response includes, in part, the EPC ID (IDr), certificate (CERT), and authorization (AUTH). At 538, the gateway receives the authorization response from the EPC and utilizes its shared secret key (Kgr) to decrypt the contents of the message. At 540, the gateway examines the contents of the authorization response and prepares a payload to be transmitted to the terminal. At 542, the gateway applies the appropriate encryption protocol (Sat Link Encr) to encrypt the message. At 544, the gateway transmits the authorization response to the terminal. According to at least one embodiment, the entire content of the message from the gateway to the terminal is encrypted. This differs from communications with the EPC and the eNodeB which include unencrypted headers.

At 546, the terminal decrypts the contents of the message received from the gateway, and examines the contents of the authorization response (IKE_AUTH Resp) originally generated by the EPC. At 550, the terminal utilizes the shared secret key (Kiv) between itself and the eNodeB to encrypt the contents of the authorization response. As illustrated in FIG. 5B, the authorization response transmitted to the eNodeB includes an unencrypted header (HDR) and an encrypted payload. At 554, the eNodeB utilizes the shared secret key (Kiv) in order to decrypt the authorization response received from the terminal.

At 556, the eNodeB verifies the EPC certificate and digital signature. Upon verifying the EPC certificate and digital signature, an end to end IPsec tunnel is created between the eNodeB and the EPC. According to the illustrated embodiment, the end to end IPsec tunnel can include a first segment 558 between the terminal and the gateway, a second segment 560 between the gateway and the EPC, and a third segment 562 between the eNodeB and the terminal. While FIG. 5 illustrates the first segment 558 as a satellite security tunnel, it should be noted that an IPsec tunnel can also be established between the terminal and the gateway. Regardless of the specific security protocol implemented with the first segment 558, however, the end to end tunnel between the eNodeB and the EPC will be an IPsec tunnel. The end to end IPsec tunnel can now be used to provide secure CBoS. Additionally, satellite GTP acceleration can be applied, where appropriate, to traffic between the eNodeB and EPC, because the gateway and terminal are capable of decrypting and examining the traffic contents.

Figure 6:
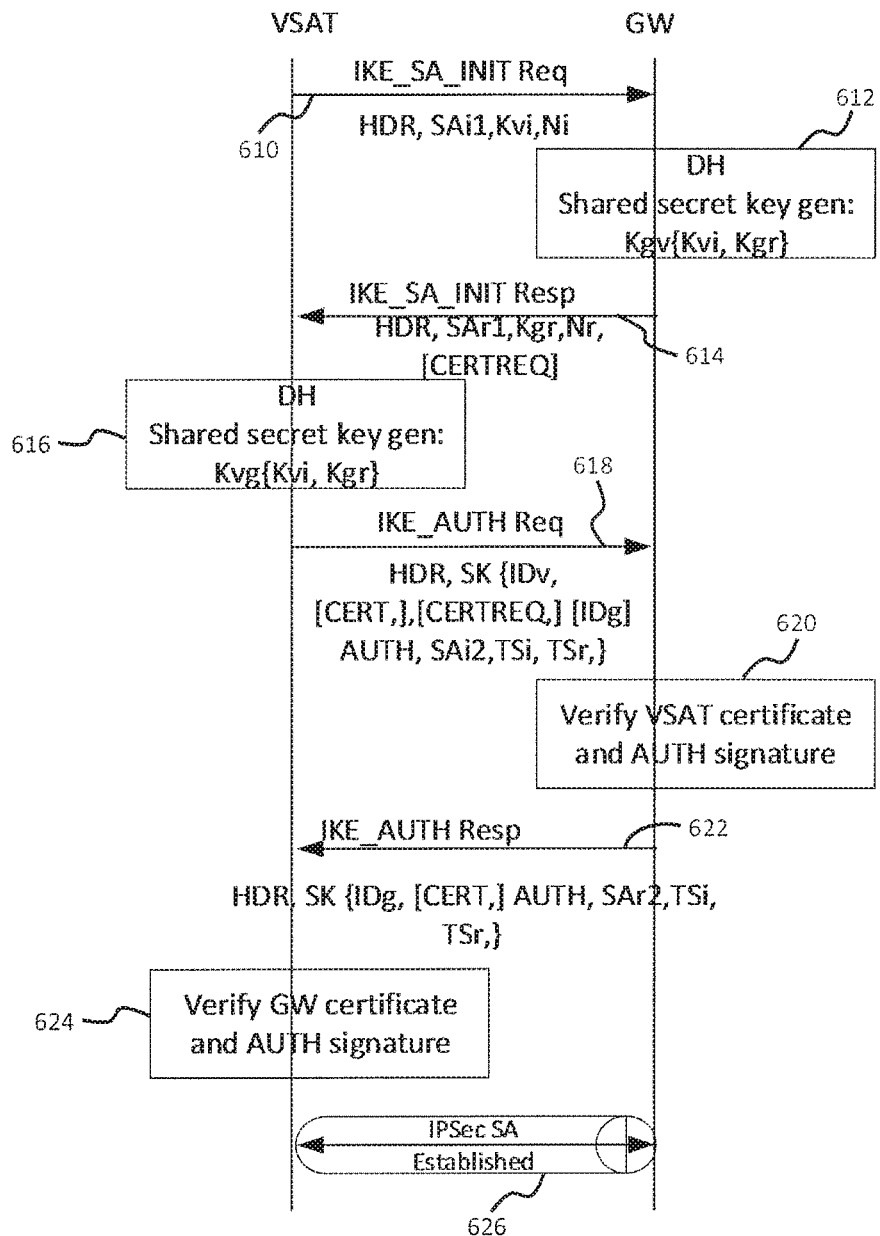
FIG. 6 is a diagram illustrating a process for establishing a security association between a terminal and gateway, according to one embodiment.

FIG. 6 is a diagram illustrating a process for establishing a security association between a terminal and gateway, according to at least one embodiment. At 610, the terminal sends a request (IKE_SA_INIT Req) to establish a security association with the gateway. The request can include, for example, a public key belonging to the terminal (Kvi), the supported encryption algorithms (SAil), and Ni (which is random number). At 612, the gateway applies a Diffie-Hellman key exchange algorithm based on Kvi and its public key (Kgr) in order to generate a shared secret key (Kvg) that can be used to encrypt traffic between itself and the terminal. At 614, the gateway sends a response (IKE_SA_INIT Resp) to the terminal. According to at least one embodiment, the response includes the gateway public key (Kgr), the supported encryption algorithms (SAr1), and Nr. The gateway response also includes a CERTREQ parameter requesting the terminal to send its certificate.

At 616, the terminal applies a Diffie-Hellman key exchange algorithm based on the gateway public key (Kvi) and its public key (Kgr) in order to generate a shared secret key (Kvg) that can be used to encrypt traffic between itself and the gateway. At 618, the terminal sends a request to initiate authorization (IKE_AUTH Req) to the gateway containing its certificate (CERT), identity (IDv), and CERTREQ parameter requesting the gateway send its certificate. According to at least one embodiment, the terminal can also include an IDr parameter to indicate the identity of the gateway with which it would like to setup the IPsec connection. Additionally, the terminal utilizes the shared secret key (Kvg) to encrypt the request prior to sending to the gateway. At 620, the gateway receives the request, and contacts the certificate authority (CA) to validate the terminal certificate. Once the terminal's certificate has been certified, the gateway sends a response (IKE_AUTH Resp) at 622. The response includes the gateway's certificate (CERT). Additionally, the gateway applies the shared secret key (Kvg) to encrypt the contents of the response. At 624, the terminal receives the response, applies the shared secret key (Kvg) to decrypt its contents, and validates the gateway certificate. Upon validating the gateway certificate, the IPsec tunnel 626 is established between the terminal and the gateway.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described terminal and gateway. Additionally, such hardware can be interfaced to connect and/or facilitate communication between different components such as the gateway CPU, workstation, database, and RF transmitter.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C #, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 7:
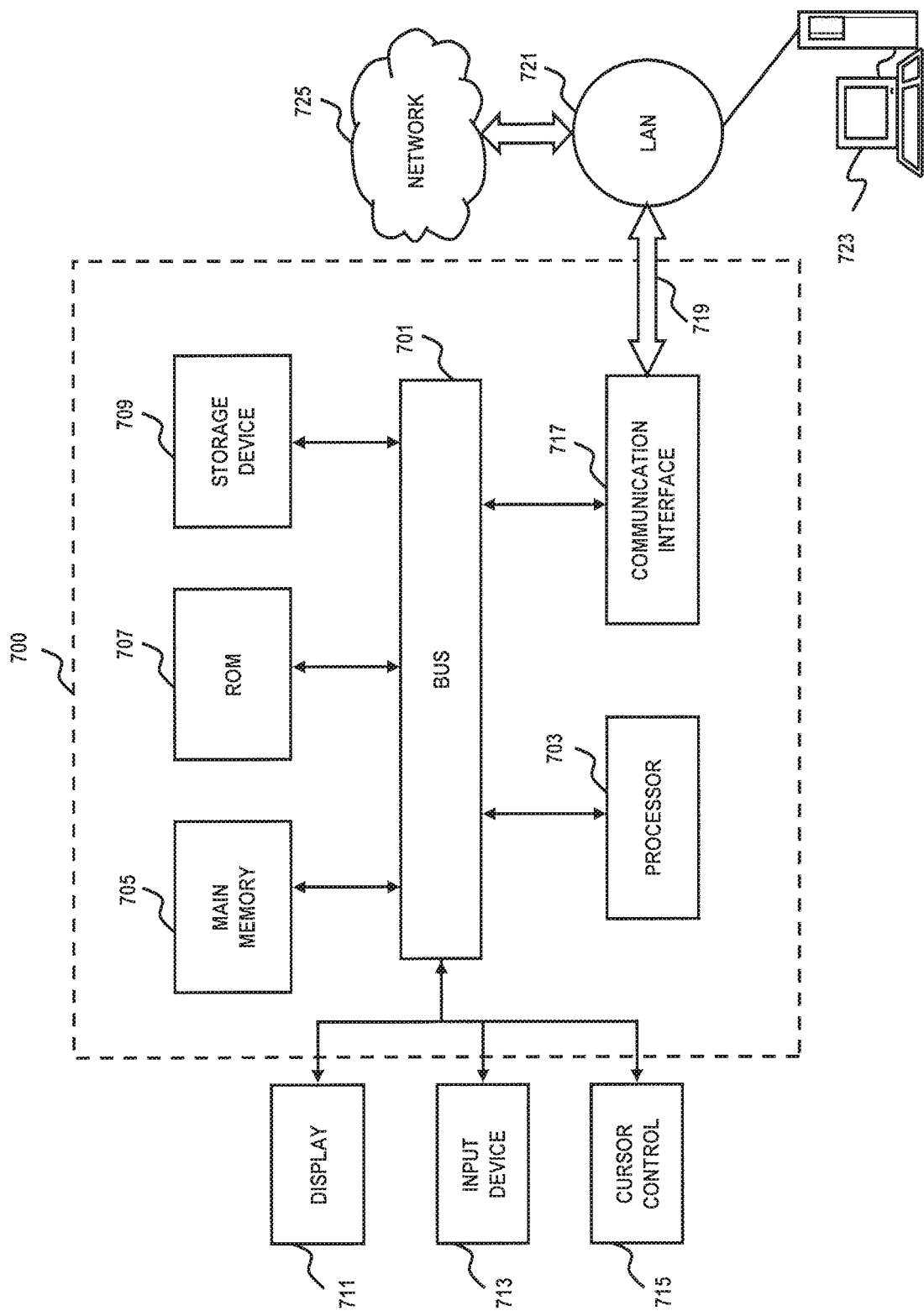
FIG. 7 is a diagram of a computer system that can be used to implement various exemplary embodiments.

FIG. 7 is a diagram of a computer system that can be used to implement features of various embodiments. The computer system 700 includes a bus 701 or other communication mechanism for communicating information and a processor 703 coupled to the bus 701 for processing information. The computer system 700 also includes main memory 705, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a light emitting diode (LED) or other flat panel displays, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. Additionally, the display 711 can be touch enabled (i.e., capacitive or resistive) in order facilitate user input via touch or gestures.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a High Definition Multimedia Interface (HDMI), etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 such as a wide area network (WAN) or the Internet. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Non-volatile media can further include flash drives, USB drives, microSD cards, etc. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
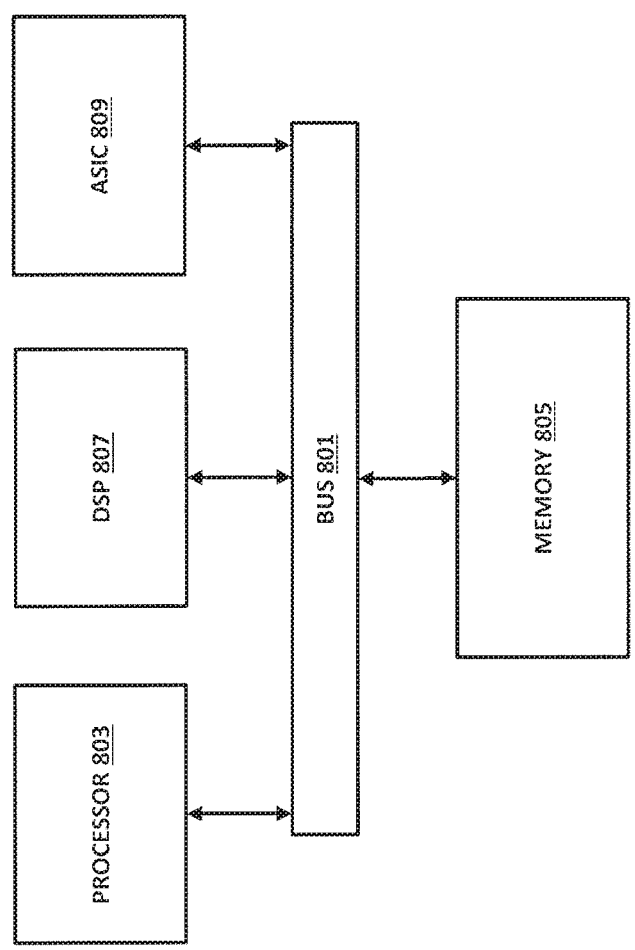
FIG. 8 is a diagram of a chip set that can be used to implement various exemplary embodiments.

FIG. 8 illustrates a chip set 800 upon which features of various embodiments may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the figures.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   receiving a request from a first entity to establish a security association with a second entity, the request being received by a satellite terminal of a satellite communication system, the first entity and the second entity being part of a different communication system;
   establishing a first secure tunnel between the satellite terminal and a gateway of the satellite communication system;
   establishing a second secure tunnel between the gateway and the second entity based, at least in part, on a certificate belonging to the first entity;
   establishing a third secure tunnel between the satellite terminal and the first entity based, at least in part, on a certificate belonging to the second entity, a first entity public key, and a satellite terminal public key;
examining contents of encrypted traffic between the first entity and the second entity; and
applying GTP acceleration to eligible traffic transmitted over the first secure tunnel,
wherein an end to end IPsec tunnel is established between the first entity and the second entity.

2. The method of claim 1, wherein the first secure tunnel implements AES-256 link layer encryption between the satellite terminal and the gateway.

3. The method of claim 2, wherein establishing a first secure tunnel comprises establishing an IPsec tunnel between the satellite terminal and the gateway.

4. The method of claim 2, wherein the GTP acceleration includes at least one of GTP tunnel header reduction, TCP acceleration, data compression, and QoS-based traffic prioritization.

5. The method of claim 1, wherein establishing a second secure tunnel comprises:
establishing a security association between the gateway and the second entity based on a gateway public key and a second entity public key; and
authenticating the security association based, at least in part, on the first entity certificate.

6. The method of claim 5, wherein establishing a security association comprises:
replacing a public key contained in the request from the first entity with a public key belonging to the gateway;
transmitting the request to the second entity;
receiving a response from the second entity containing, in part, a public key belonging to the second entity; and
generating a shared key between the gateway and the second entity based on the gateway public key and the second entity public key.

7. The method of claim 5, wherein authenticating the security association comprises:
encrypting an authentication request received from the first entity, using a shared key between the gateway and the second entity;
transmitting the authentication request to the second entity, the authentication request including a first entity certificate;
receiving an authentication response containing, in part, a second entity certificate; and
forwarding the authentication response to the first entity.

8. The method of claim 1, wherein establishing a third secure tunnel comprises:
establishing a security association between the first entity and the satellite terminal; and
authenticating the security association based, at least in part, on the second entity certificate.

9. The method of claim 8, wherein establishing a security association comprises:
retrieving a public key belonging to the first entity from the request;
replacing a public key contained in a response from the second entity with a public key belonging to the satellite terminal;
transmitting the response to the first entity; and
generating a shared key between the first entity and the satellite terminal based on the first entity public key and the satellite terminal public key.

10. The method of claim 8, wherein authenticating the security association comprises:
receiving an authentication request containing, in part, a first entity certificate;
forwarding the authentication request to the second entity;
encrypting an authentication response received from the second entity, using a shared key between the first entity and the satellite terminal; and
transmitting the authentication response to the first entity, the authentication response including a second entity certificate.

11. A system comprising:
a gateway including one or more processors, one or more transceivers, and one or more communication interfaces;
a satellite terminal including at least one processor, at least one transceiver, and at least one communication interface; and
a satellite for facilitating communication between the gateway and the satellite terminal,
the satellite terminal being configured to:
receive a request from a first entity to establish a security association with a second entity,
establish a first secure tunnel with the gateway,
establish a third secure tunnel with the first entity based, at least in part, on a certificate belonging to the second entity, a first entity public key, and a satellite terminal public key,
examine contents of encrypted traffic from the first entity, and
apply GTP acceleration to eligible traffic transmitted over the first secure tunnel,
the gateway being configured to:
establish a second secure tunnel with the second entity based, at least in part, on a certificate belonging to the first entity,
examine contents of encrypted traffic from the second entity, and
apply GTP acceleration to eligible traffic transmitted over the first secure tunnel,
wherein the first entity and the second entity are part of a different communication system, and
wherein an end to end IPsec tunnel is established between the first entity and the second entity.

12. The system of claim 11, wherein the satellite terminal is further configured to establish the first secure tunnel using AES-256 link layer encryption.

13. The system of claim 11, wherein the first secure tunnel comprises an IPsec tunnel between the satellite terminal and the gateway.

14. The system of claim 11, wherein the GTP acceleration includes at least one of GTP tunnel header reduction, TCP acceleration, data compression, and QoS-based traffic prioritization.

15. The system of claim 11, wherein the gateway is further configured to establish the second secure tunnel by:
establishing a security association with the second entity based on a gateway public key and a second entity public key; and
facilitate authentication of the security association based, at least in part, on the first entity certificate.

16. The system of claim 15, wherein the gateway is configured to establish a security association by:
replacing a public key contained in the request from the first entity with a public key belonging to the gateway;
transmitting the request to the second entity;
receiving a response from the second entity containing, in part, a public key belonging to the second entity; and
generating a shared key between the gateway and the second entity based on the gateway public key and the second entity public key.

17. The system of claim 15, wherein the gateway is configured to authenticate the security association by:
  encrypting an authentication request received from the first entity, using a shared key between the gateway and the second entity;
  transmitting the authentication request to the second entity, the authentication request including a first entity certificate;
  receiving an authentication response containing, in part, a second entity certificate; and
  forwarding the authentication response to the first entity.

18. The system of claim 11, wherein the satellite terminal is further configured to establish a third secure tunnel by:
  establishing a security association between the first entity and the satellite terminal; and
  facilitate authentication of the security association based, at least in part, on the second entity certificate.

19. The system of claim 18, wherein the satellite terminal is configured to establishing a security association by:
  retrieving a public key belonging to the first entity from the request;
  replacing a public key contained in a response from the second entity with a public key belonging to the satellite terminal;
  transmitting the response to the first entity; and
  generating a shared key between the first entity and the satellite terminal based on the first entity public key and the satellite terminal public key.

20. The system of claim 18, wherein the satellite terminal is configured to facilitate authentication of the security association by:
  receiving an authentication request containing, in part, a first entity certificate;
  forwarding the authentication request to the second entity;
  encrypting an authentication response received from the second entity, using a shared key between the first entity and the satellite terminal; and
  transmitting the authentication response to the first entity, the authentication response including a second entity certificate.

* * * * *